United States Patent Office 3,472,871

Patented Oct. 14, 1969

1

2

3,472,871

1-METHYL-3-HYDROXY-6-OXO-5-[(AMIDO) ALKANOYL-HYDROZO]-2,3,5,6-TETRAHYDRO-INDOLES

Massimo Fazzini, Milan, Italy, assignor to Scharper S.a.s. per l'Industria Farmaceutica di Dott. M. Fazzini & C., Milan, Italy, a body corporate of Italy No Drawing. Filed Dec. 15, 1966, Ser. No. 601,834

Claims priority, application France, Dec. 20, 1965, 42,926

Int. Cl. C07d *27/56;* A61k *27/00*

U.S. Cl. 260—326.14 5 Claims

ABSTRACT OF THE DISCLOSURE

Novel indole derivatives of formula:

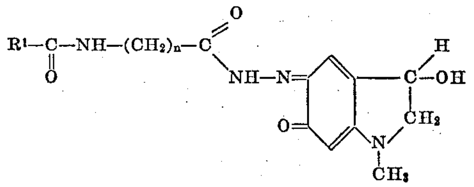

in which $R^1$ is a lower alkyl radical, having hemostatic and antifibrinolytic action.

The present invention has for its object novel indole derivatives possessing, especially, an hemostatic, antifibrinolytic and capillary protecting action, of formula:

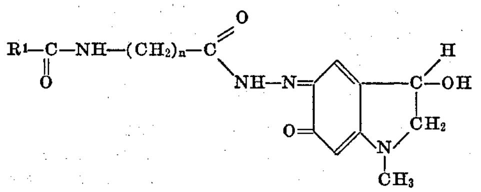

(I)

wherein $R^1$ is hydrogen or a lower alkyl group and *n* is an integer from 3 to 5.

Among such compounds of general Formula I are, in particular, the following:

1-methyl-3-hydroxy-6-oxo-5-[(6-acetamido)-n-hexanoyl-hydrazono]-2,3,5,6-tetrahydro-indole 1-methyl-3-hydroxy-6-oxo-5-[(5-acetamido)-pentanoyl-hydrazono]-2,3,5,6-tetrahydro-indole 1-methyl-3-hydroxy-6-oxo-5-[(4-acetamido)-butanoyl-hydrazono]-2,3,5,6-tetrahydro-indole The preparation of compounds of Formula I comprises reacting an hydrazine derivative of general formula:

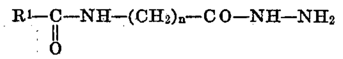

(A)

wherein $R^1$ and *n* have the above defined meanings, with 1-methyl-3-hydroxy-5,6-dioxo-tetrahydro-indole of formula:

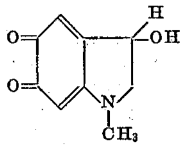

(B)

and isolating the resulting indole derivative of Formula I.

The reaction is effected normally at room temperature, in alcoholic medium, advantageously in methanol.

Hydrazine derivative (A) is prepared by reacting an amino-carboxylic acid of formula:

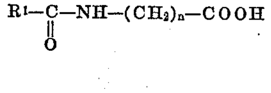

wherein $R^1$ and *n* have the above defined meanings, or preferably an ester thereof, e.g. the ethyl ester, with hydrazine.

This reaction is effected conveniently with hydrazine hydrate at room temperature in alcoholic medium, for example in ethanol.

Indole derivative (B) is prepared by reaction of silver oxide with 3,4-dihydroxy-α(methylaminomethyl)-benzyl alcohol of formula:

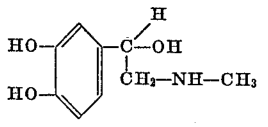

The following embodiment of the general process described above for the preparation of 1-methyl-3-hydroxy-6-oxo-5-[(6-acetamido)-n-hexanoyl-hydrazono]-2,3,5,6-tetrahydro-indole (VII) is given below purely for illustrative purposes.

EXAMPLE (A) One mole of 6-acetamido-n-hexanoic acid (II) is dissolved in 10 moles of ethyl alcohol and 0.1 mole of benzene-sulfonic acid is added. After boiling under reflux for a 6 hour period, the unreacted alcohol is distilled off. The residue is placed in a decantation funnel and a 5% by weight sodium bicarbonate solution is added to alkalinity. After addition of sodium chloride and thorough stirring, the layers are separated. The resulting ester is washed three times with distilled water, and the product is then dried over anhydrous sodium sulfate. There are obtained white crystals of ester (III) having a melting point of about 35° C.

(B) Thirty grams of 6-acetamido-n-hexanoic acid ethyl ester (III) are dissolved in 100 ml. alcohol, and 18 ml. of 85% hydrazine hydrate are added. Stirring is continued for several hours at room temperature. There are distilled 70 ml. of alcohol, and the product is precipitated with diethyl ether. The precipitate is filtered and recrystallized from chloroform. There are obtained white 6-acetamido-n-hexanoyl-hydrazine (IV) crystals, which are soluble in water and in alcohol, very poorly soluble in ether, having a melting point of 126° C.

(C) Ten grams of 3,4-dihydroxy-α-(methylamino-methyl)benzyl alcohol (V) are dissolved in 10 ml. of a 1:1 methanol-formic acid mixture. Fifty ml. of chloroform are added and the solution is drastically cooled. After stirring, oxidation is carried out during two minutes with dry thoroughly powdered silver oxide. The material is filtered over a Buchner funnel and the residue is washed with methanol; the filtrate is evaporated in vacuo at room temperature. The resulting bright red crystals are filtered and dried in vacuo. Product (VI) may be crystallized again from a methanol-formic acid mixture in the ratio 1/1.

(D) To a stirred saturated solution of 10 ml. of 1-methyl - 3 - hydroxy - 5,6-dioxo-tetrahydro-indole (VI) obtained in (C), in methanol, there are added 10 g. of 6 - acetamido - n - hexanoyl-hydrazine (IV) already prepared in (B), in methanol.

After some time, the mixture is evaporated, in vacuo, at room temperature, to effect the crystallization of the product which is completed by drastic cooling. For purification purposes, the product is dissolved in methanol and is passed through chromatographic grade alumina, and the product is then precipitated with ether from the concentrated alcohol solution.

The desired product (VII) is obtained in the form of thin orange crystals, soluble in water and alcohols, and almost insoluble in benzene and ether. The melting point is 173° C. and the M.W. is 348.11.

The above embodiment is illustrated by the following reaction sequence:

(A)

$$CH_3-CO-NH-(CH_2)_5-COOH+C_2H_5OH \rightarrow$$
(II)
$$\rightarrow CH_3-CO-NH-(CH_2)_5-COOC_2H_5+H_2O$$
(III)

(B)

$$CH_3-CO-NH-(CH_2)-COOC_2H_5 + NH_2{=}NH_2 \cdot H_2O \rightarrow$$
(III)
$$\rightarrow CH_3-CO-NH-(CH_2)_5-CO-NH-NH_2+C_2H_5OH$$

(C)

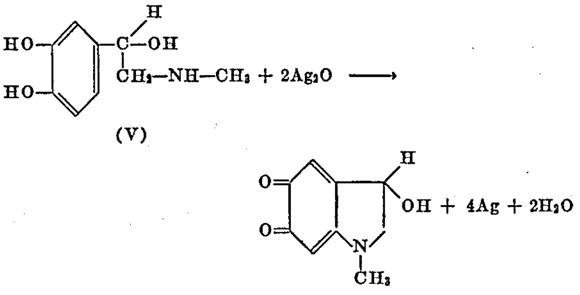

(V)

(VI)

(D)

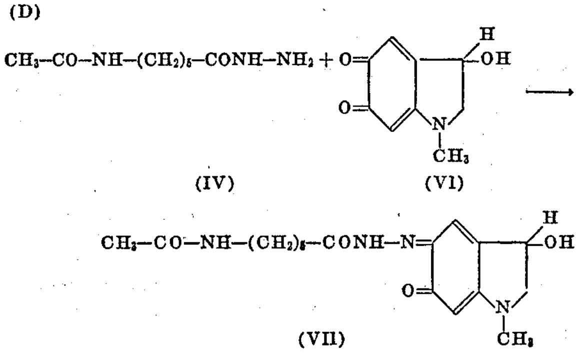

(IV) (VI)

(VII)

The toxicological and pharmacological tests effected with the compounds of Formula I and especially those having given the results set forth below have shown that, with respect to the other adrenochrome derivatives having a similar effect, such compounds had a much wider and more potent activity, together with very low toxicity.

The hemostatic action of compounds of Formula I is related not only to their capacity to act on the permeability of the capillaries, but also on coagulation factors.

1—TOXICITY

On intraperitoneal administration, a dosage in excess of 5 g./kg. of the compound has evidenced no toxicity. Similarly, this freedom from toxicity has been demonstrated by chronic administration to rabbits of 1 g./kg. of active principle, by the intravenous route. Oral administration of the product to rats, during a period of time of two months, at a dosage of 200 mg./kg. has shown no potential toxicity. No reaction was noted on the part of elements from the white and red blood corpuscles, nor on the part of the principal organs (lungs, heart, spleen, liver, and the like).

2—PHARMACOLOGICAL TESTS

(a) Capillary permeability test

In rabbits, diffusion of Trypan blue after administration of histamine is blocked on intravenous administration of 75 mg./kg. of the compound.

The diffusion of Evans blue, after histamine, 5-hydroxy-tryptamine or bradykinine administration is blocked in rat on intraperitoneal administration of 25 mg./kg. of the compound.

(b) Capillary resistance test

The capillary resistance of scurvied Guinea-pig reverts to normal upon administration of 25 mg./kg. of the compound, during 3 days.

(c) Bleeding test

From an administration of 10 mg./kg. of the compound, the bleeding time is decreased in rabbit.

(d) Anti-fibrinolytic activity

The anti-fibrinolytic activity was investigated either with an urekinase activated fibrinolytic system, or by observing the inhibition of the lysis by streptokinase in a fibrinogen, plasminogen or thrombin system. Evidence was obtained, with this test, of the highly marked anti-fibrinolytic action of compounds of Formula I.

(e) Anti-peptidasic activity

Using casein as substrate and trypsin or kallikrein as enzymes, the inhibiting action of the peptidases of the new compounds of Formula I could be demonstrated.

(f) Systemic dextrane-induced oedema test

The oedemas are blocked in rat as soon as 50 mg./kg. of the compound are administered.

The above tests show that the products according to the invention possess useful properties for the inhibition of the factors interfering with blood coagulation and causing hemorrhages.

Having now described my invention, what I claim as new and desire to secure by Letters Patent is:

1. A novel indole derivative of formula:

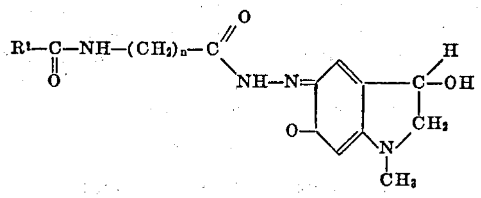

wherein $R^1$ is a lower alkyl group and $n$ is an integer from 3 to 5.

2. A derivative as claimed in claim 1 which is 1-methyl - 3 - hydroxy-6-oxo-5-[(6-acetamido)-n-hexanoyl-hydrazono]-2,3,5,6-tetrahydro-inole.

3. A derivative as claimed in claim 1 which is 1-methyl - 3 - hydroxy-6-oxo-5-[(5-acetamido)-pentanoyl-hydrazono]-2,3,5,6-tetrahydro-indole.

4. A derivative as claimed in claim 1 which is 1-methyl - 3 - hydroxy-6-oxo-5-[(4-acetamido)-butanoyl-hydrazono]-2,3,5,6-tetrahydro-indole.

5. A derivative as claimed in claim 1, wherein $R^1$ is methyl.

References Cited

UNITED STATES PATENTS

| | | | |
|---|---|---|---|
| 2,506,294 | 5/1950 | Dechamps et al. | 167—65 |
| 2,655,510 | 10/1953 | Sobotka | 260—326.14 |

FOREIGN PATENTS

| | | |
|---|---|---|
| 38/17,034 | 9/1963 | Japan. |

ALEX MAZEL, Primary Examiner

J. A. NARCAVAGE, Assistant Examiner

U.S. Cl. X.R.

260—326.15, 326.16; 424—274